United States Patent
Ishii et al.

(10) Patent No.: US 8,145,834 B2
(45) Date of Patent: Mar. 27, 2012

(54) STORAGE APPARATUS, DISK CONTROLLER, AND COMMAND ISSUE CONTROL METHOD

(75) Inventors: Atsushi Ishii, Kawasaki (JP); Tomoaki Tsuruta, Kawasaki (JP); Hiroaki Ochi, Kawasaki (JP); Tsukasa Makino, Kawasaki (JP); Marie Abe, Kawasaki (JP); Masanori Itou, Kawasaki (JP); Koji Ohtsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 12/385,362

(22) Filed: Apr. 6, 2009

(65) Prior Publication Data

US 2009/0292867 A1  Nov. 26, 2009

(30) Foreign Application Priority Data

May 21, 2008 (JP) .................. 2008-132614

(51) Int. Cl.
*G06F 12/00* (2006.01)

(52) U.S. Cl. .................. 711/112; 711/113; 711/114

(58) Field of Classification Search .................. 711/112, 711/113, 114
See application file for complete search history.

(56) References Cited

U.S. PATENT DOCUMENTS

| 7,185,156 | B2 | 2/2007 | Fujibayashi | |
|---|---|---|---|---|
| 7,305,520 | B2 | 12/2007 | Voigt et al. | |
| 2006/0031638 | A1* | 2/2006 | Li | 711/114 |
| 2006/0047900 | A1* | 3/2006 | Tanaka et al. | 711/113 |
| 2008/0005396 | A1* | 1/2008 | Suzuki et al. | 710/38 |

FOREIGN PATENT DOCUMENTS

| JP | 3-103956 | 4/1991 |
|---|---|---|
| JP | 8-249263 | 9/1996 |
| JP | 10-049309 | 2/1998 |
| JP | 10-275059 | 10/1998 |
| JP | 2004-206623 | 7/2004 |
| JP | 2005-157830 | 6/2005 |
| JP | 2005-222539 | 8/2005 |
| JP | 2005-267239 | 9/2005 |
| JP | 2005-275829 | 10/2005 |
| JP | 2005-301640 | 10/2005 |
| JP | 2005-332236 | 12/2005 |

OTHER PUBLICATIONS

Japanese Office Action issued Mar. 9, 2010 in corresponding Japanese Patent Application 2008-132614.

* cited by examiner

*Primary Examiner* — Hoai V Ho
*Assistant Examiner* — Tri Hoang
(74) *Attorney, Agent, or Firm* — Staas & Halsey LLP

(57) ABSTRACT

The storage apparatus of the present invention includes a disk controller (CM) that issues a command to a disk via a fabric device. The CM controls the number of commands to be issued to the disk based on the structure of the storage apparatus and the operation state of the storage apparatus.

7 Claims, 6 Drawing Sheets

STORAGE APPARATUS, DISK CONTROLLER, AND COMMAND ISSUE CONTROL METHOD

CROSS-REFERENCE TO RELATED APPLICATIONS

This application is based upon and claims the benefit of priority of the prior Japanese Patent Application No. 2008-132614, filed on May 21, 2008, the entire contents of which are incorporated herein by reference.

FIELD

An embodiment of the present invention relates to a storage apparatus, a disk controller and a command issue control method, and in particular to a storage apparatus, a disk controller and a command issue control method for controlling the number of commands to be issued to a disk.

BACKGROUND

As a conventional technique relating to a storage system, there is proposed a storage system that assigns control of virtual storage segments among multiple controllers (for example, see Japanese Laid-Open Patent Publication No. 2005-222539).

As a method for connecting a target (disk) and an initiator (disk controller) in a storage apparatus, there are a loop (arbitrated loop) method and a fabric method.

The loop method is a connection method in which the initiator, the target and the like are sequentially connected in a loop. Since the loop method can connects multiple nodes without relatively expensive fibers, channels or switches, it is possible to economically construct a SAN. However, in the loop method, since all the nodes share one loop, the performance deteriorates as the number of nodes increases.

On the other hand, the fabric method refers to a network in which fiber channel switches are used or in which fiber channel switches are mutually connected. The fabric method is superior in extensibility because the port of the initiator and the port of the target are not directly connected. Furthermore, in comparison with the loop method in which multiple targets are loop-connected, a higher command processing capability can be expected because a command is transmitted only via a fabric device.

FIG. 5 illustrates an example of a structure of a storage apparatus in which the fabric method and the loop method are used being combined. A fabric device 100 illustrated in FIG. 5 includes fiber channel switches (FS's) that are mutually connected (not illustrated in FIG. 5), and the fabric device 100 relays commands issued from disk controllers 101 to disks 102 via the FS's. Groups of disks a1 to a3, disks b1 to b3, disks c1 to c3, and disks d1 to d3 in FIG. 5 are groups in which the disks are loop-connected. FIG. 5 illustrates an example in which three disks are connected to each loop.

On the other hand, each disk controller 101 is fabric-connected to each disk loop, and therefore, it is possible to easily issue a command from each disk controller to each disk loop.

Thus, the fabric method is a connection method superior in extensibility and performance. However, in the case of a storage apparatus with a large-scale structure, when a large number of commands are issued from multiple disk controllers, the command response deteriorates even though the fabric method is adopted. In the worst case, a command times out due to response delay, and disk abnormality is judged.

For example, there is a problem that, when a large number of commands are issued from the disk controllers 101 to the disks 102 beyond the performance of the disk d1 in FIG. 5 (see #1 in FIG. 5), the transfer rate between the fabric device 100 and the disk d1 decreases and the fabric device 100 cannot sufficiently process the commands, so that command processing is blocked (see #2 in FIG. 5).

As a measure for preventing the blockage of command processing in the fabric device 100 due to issue of a large number of commands, a method for restricting the number of commands which can be issued by the disk controller 101 at a time for each disk according to the performance of the disk is conceivable. The method is referred to as a restriction-according-to-disk-performance method. In the restriction-according-to-disk-performance method, when the number of commands exceeds the number of commands that can be issued by the disk controller 101 at a time, queuing of the commands is performed in the disk controller to avoid transmission of a large number of commands to the fabric device 100. It is because the performance differs among the disks 102 connected to the fabric device 100 that queuing of commands is performed for each disk. When a large number of commands are issued to a disk 102 with a low performance, response delay occurs at the stage of command processing in the disk 102. Therefore, in order to control the number of commands to be issued according to the performance of a disk, the restriction-according-to-disk-performance method sets the upper limit of the number of commands to be issued according to the performance of the disk 102 and controls the number of commands to be issued so that the number does not exceed the upper limit.

However, for example, when the structure of a storage apparatus is large-scaled and the number of disks 102 in each loop increases, as illustrated in FIG. 6, it becomes impossible to prevent blockage of command processing in the fabric device 100 by controlling the number of commands to be issued by the restriction-according-to-disk-performance method. As a result, the command response deteriorates. This is because, when the total number of the disks 102 connected to the fabric device 100 increases as the number of loop-connected disks 102 increases, the number of commands to be issued to a particular disk 102 increases to the extent that the fabric device 100 cannot perform processing the commands even though each disk controller 101 restricts, for each disk, the number of commands to be issued.

SUMMARY

The storage apparatus of an embodiment of the present invention is a storage apparatus comprising a disk controller that issues a command to a disk via a relay device. The disk controller comprises command issue control unit for controlling the number of commands to be issued to the disk based on the structure of the storage apparatus and the operation state of the storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
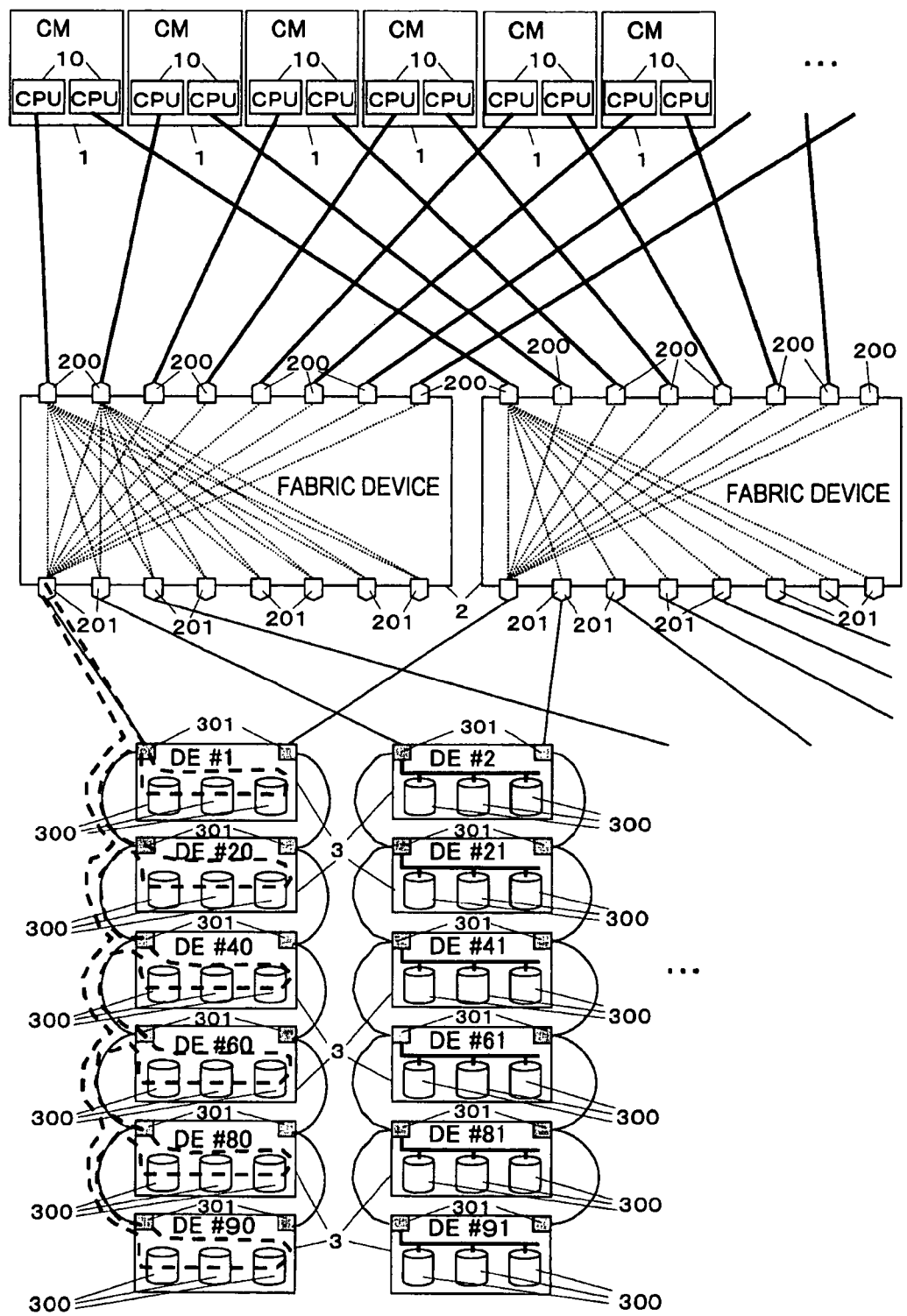
FIG. 1 is a diagram illustrating an example of the whole structure of a storage apparatus according to an embodiment.

FIG. 1 is a diagram illustrating an example of the whole structure of a storage apparatus according to an embodiment of the invention. The storage apparatus illustrated in FIG. 1 includes CMs (control modules) 1 which are disk controllers for issuing commands to disks 300 via fabric devices 2. Each CM 1 includes a CPU 10. A command issued by a CM 1 is transmitted to a target (command transmission destination) disk 300 from the CPU 10 via the fabric device 2. Specifically, a fiber channel 202 (see FIG. 2) provided for the fabric device 2 receives the command via a communication port 200 and relays the command to the target disk 300 via a communication port 201.

The disks 300 are loop-connected. That is, on a route after the fabric device 2, as illustrated by a broken line in the figure, one loop (disk loop) is formed by connecting disks 300 in each DE (driver enclosure) 3. In the example illustrated in FIG. 1, each DE 3 includes three disks 300, and each PBC (port bypass circuit) 301 provided in each DE 3 relays a command transmitted from the fabric device 2 to a disk 300 within its DE 3 or a disk 300 within a different DE 3. The fabric device 2 and the PBC's 301 are connected via an FC (fiber channel) cable. A PBC 301 within a DE 3 and a PBC 301 in another different DE 3 are connected via an FC cable.

Figure 2:
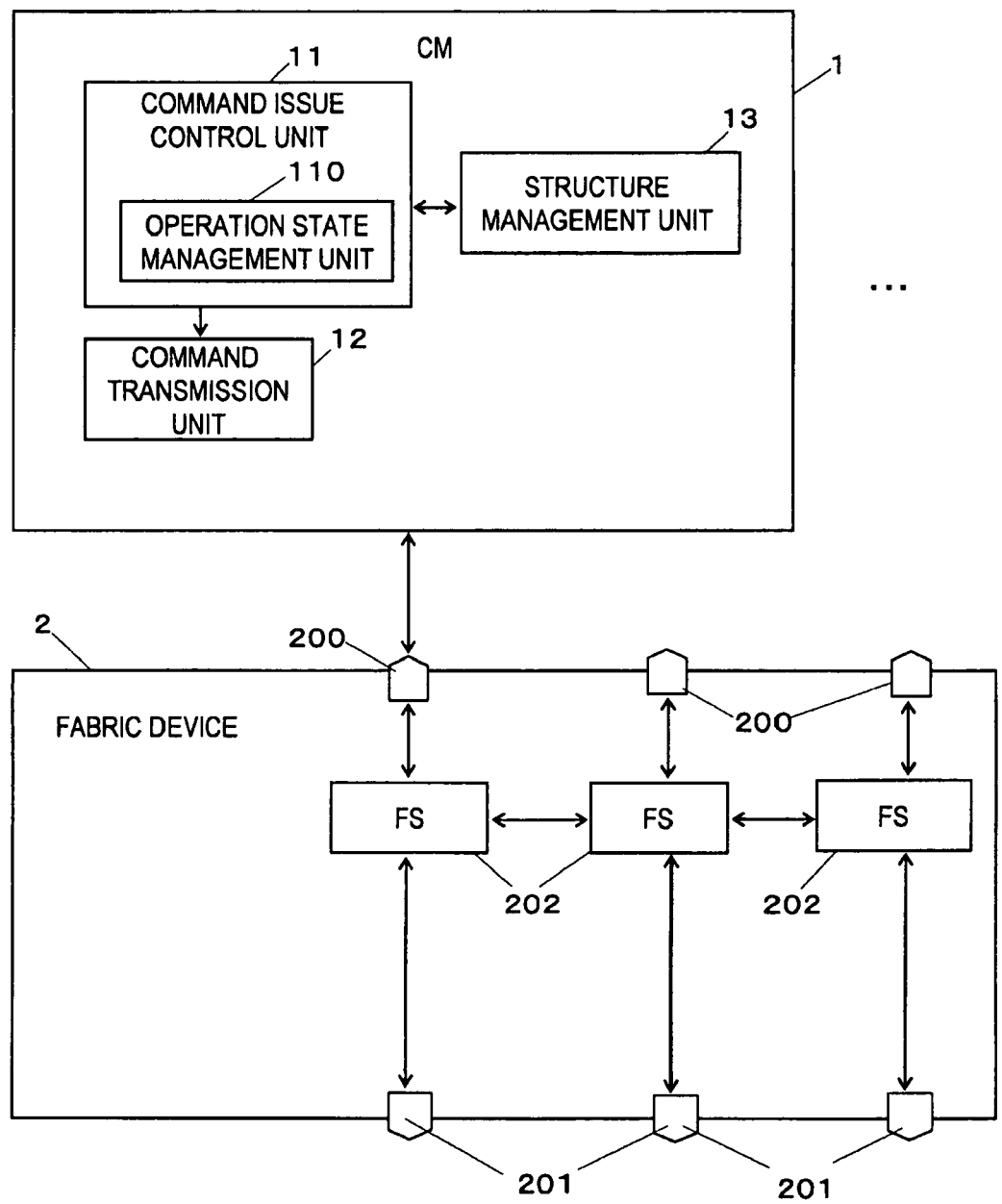
FIG. 2 is a diagram illustrating an example of the structure of a CM and a fabric device.

FIG. 2 is a diagram illustrating an example of a structure of the CM and the fabric device in FIG. 1. The CM 1 includes a command issue control unit 11, a command transmission unit 12, and a structure management unit 13. The command issue control unit 11 issues a command. The command issue control unit 11 controls, for each disk, the number of commands to be issued to the disks 300 based on the structure of the storage apparatus and the operation state of the storage apparatus. Specifically, the command issue control unit 11 obtains structure information about the storage apparatus from the structure management unit 13, and controls the number of commands to be issued to each of the disks 300 based on the structure information and operation state information about the storage apparatus managed by an operation state management unit 110. The structure information about the storage apparatus is, for example, information about the apparatus model of the storage apparatus and information including the number of disk loops, the types of the disks and so on. The structure information about the storage apparatus may include information about the number of CMs 1 and the number of mounted disks 300. The number of mounted disks 300 may be the total number of disks 300 mounted on the storage apparatus, or the number may be the number of disks 300 connected to one loop. The operation state information about the storage apparatus is information that includes at least the number of operating disks 300. The operation state management unit 110 provided for the command issue control unit 11 manages the operation state information about the storage apparatus. That is, the operation state management unit 110 monitors the controls performed by command issue control unit 11, then obtains and holds inside the number of disks 300 to which commands were issued as the operation state information.

In addition to controlling, for each disk, the number of commands to be issued as described above, the command issue control unit 11 may also monitor the number of operating disks and control the number of commands to be issued to each loop so that the number of commands to be issued to each disk loop is equal to or smaller than a predetermined number of commands to be issued. The number of disks operating in a certain loop may be monitored, or the number of disks operating in the whole storage apparatus may be monitored, as the number of operating disks.

The command transmission unit 12 transmits the command issued by the command issue control unit 11 to a target disk 300 via the fabric device 2.

The fabric device 2 includes fiber channel switches (FS's) 202 which transmit the command transmitted from the command transmission unit 12 of the CM 1 via the communication port 200, to a target disk 300 via a communication port 201.

The functions of the CM 1 and the fabric device 2 are realized by the CPU and a program executed on the CPU. The program can be stored in a computer-readable recording medium, for example, a semi-conductor memory, a hard disk, a CD-ROM, a DVD and so on. The program is recorded in such a recording medium and provided. Otherwise, the program is provided via transmission/receiving using network via a communication interface.

A first embodiment of the present invention will be described below. In command issue control processing of the first embodiment, the CM 1 determines, for each of the disks 300, the upper limit of the number of commands to be issued to each disk, based on the structure of the storage apparatus and the operation state of the storage apparatus, and restricts the number of commands to be issued to the disk 300 so that the number is equal to or smaller than the determined upper limit. For example, the CM 1 determines the upper limit of the number of commands to be issued to each disk, based on information about the number of disk loops included in the structure information of the storage apparatus, the kind of the disk 300 to be targeted, the number of mounted disks, and the number of CMs 1, and the number of operating disks 300 included in the operation state information managed by the operation state management unit 110. As described before, the number of mounted disks may be the number of disks 300 connected to one loop.

Figure 3:
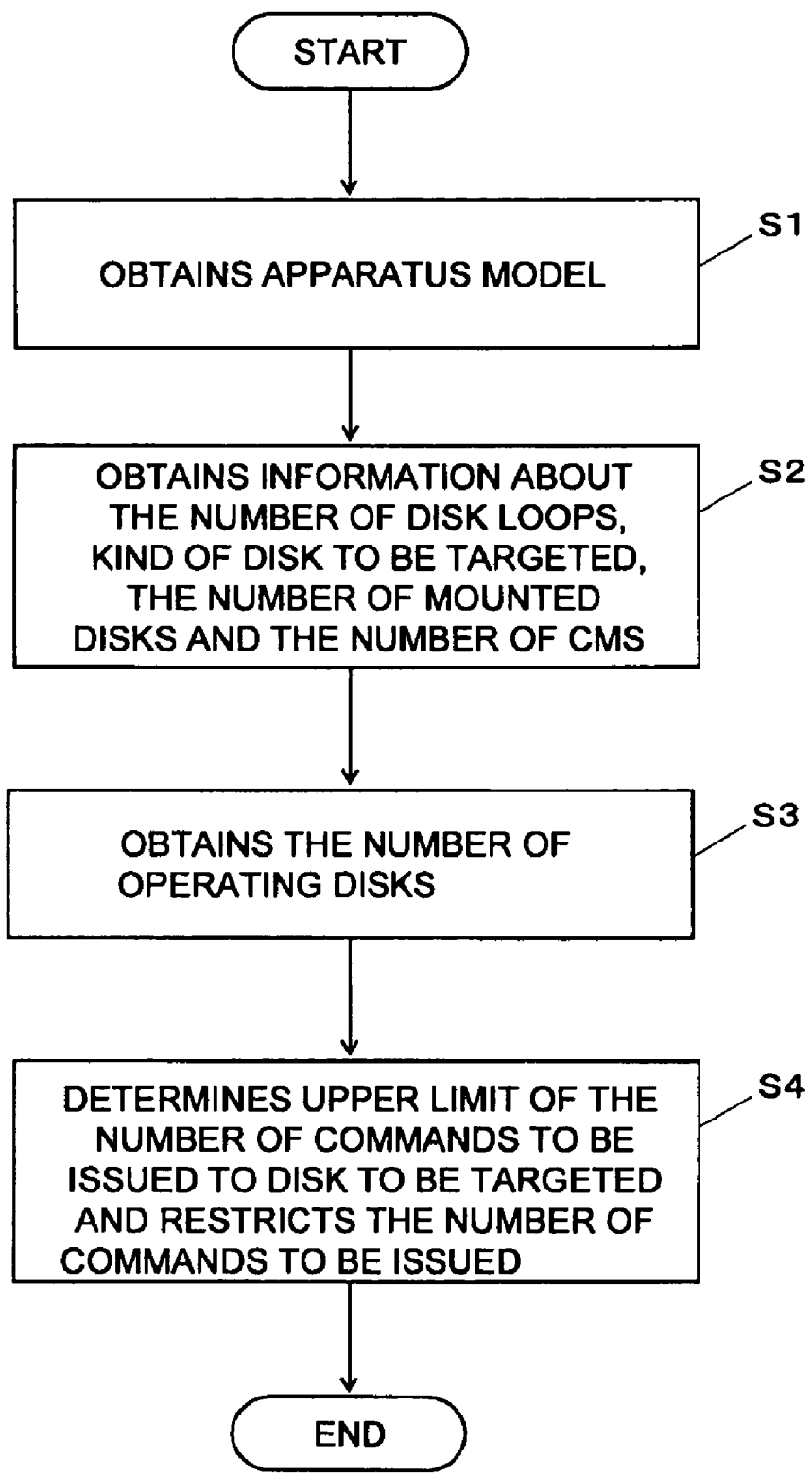
FIG. 3 is a diagram illustrating a command issue control processing flow of a first embodiment of the present invention.

FIG. 3 is a diagram illustrating a command issue control processing flow of the first embodiment. First, the command issue control unit 11 of the CM 1 obtains structure information about the storage apparatus from the structure management unit 13, and obtains the apparatus model of the storage apparatus included in the structure information (step S1). The command issue control unit 11 further obtains information about the number of disk loops included in the structure information, the kind of the disk 300 to be targeted, the number of mounted disks, and the number of CMs 1 (step S2). The command issue control unit 11 obtains the number of operating disks 300 included in operation state information managed by the operation state management unit 110 (step S3). Based on information about the apparatus model, the number of disk loops, the kind of the disk 300 to be targeted, the number of mounted disks and the number of CMs 1, and the number of operating disks 300, the command issue control unit 11 determines the upper limit of the number of commands to be issued to the disk to be targeted using information about the apparatus model, the number of disk loops, the kinds of disks, the number of mounted disks and the number of CMs 1, the number of operating disks 300, which are corresponding to the upper limit of the number of commands to be issued and stored in predetermined storage unit in advance. Then, command issue control unit 11 restricts the number of commands to be issued to the disk 300 to be targeted so that the number is equal to or smaller than the determined upper limit of the number of commands to be issued (step S4).

In the first embodiment described above, since the CM 1 controls the number of commands to be issued to the disks 300 based on the structure of the storage apparatus and the operation state of the storage apparatus, it is possible to control the number of commands to be issued and prevent command response deterioration even in the case where the structure of the storage apparatus is large-scaled.

Figure 4:
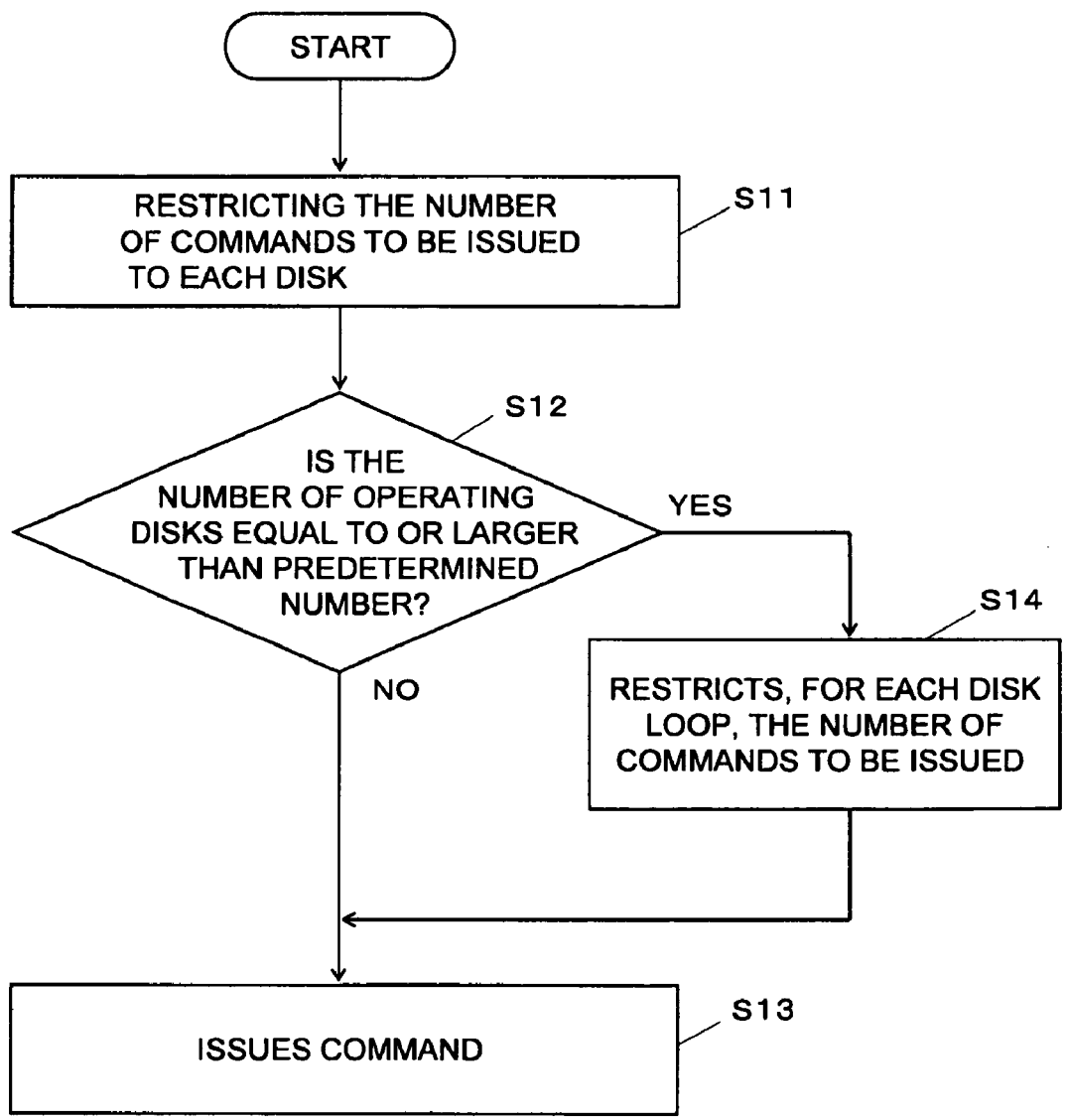
FIG. 4 is a diagram illustrating a command issue control processing flow of a second embodiment of the present invention.
Figure 5:
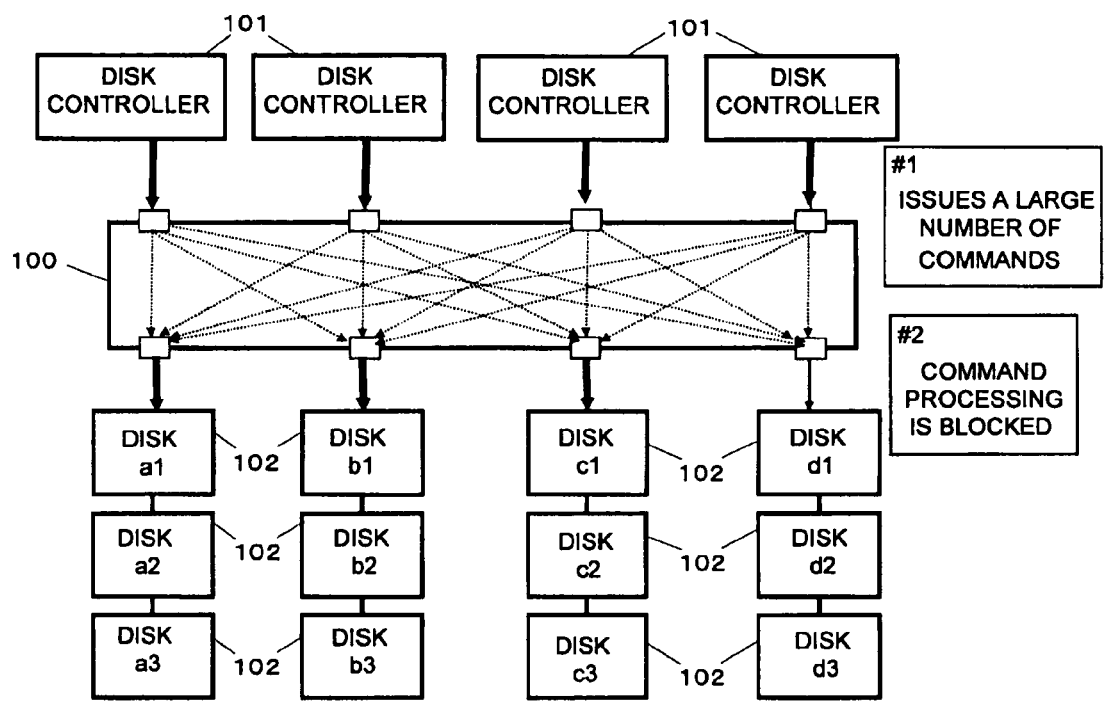
FIGS. 5 and 6 illustrate an example of a structure of a storage apparatus in which a fabric method and a loop method are combined and used.
Figure 6:
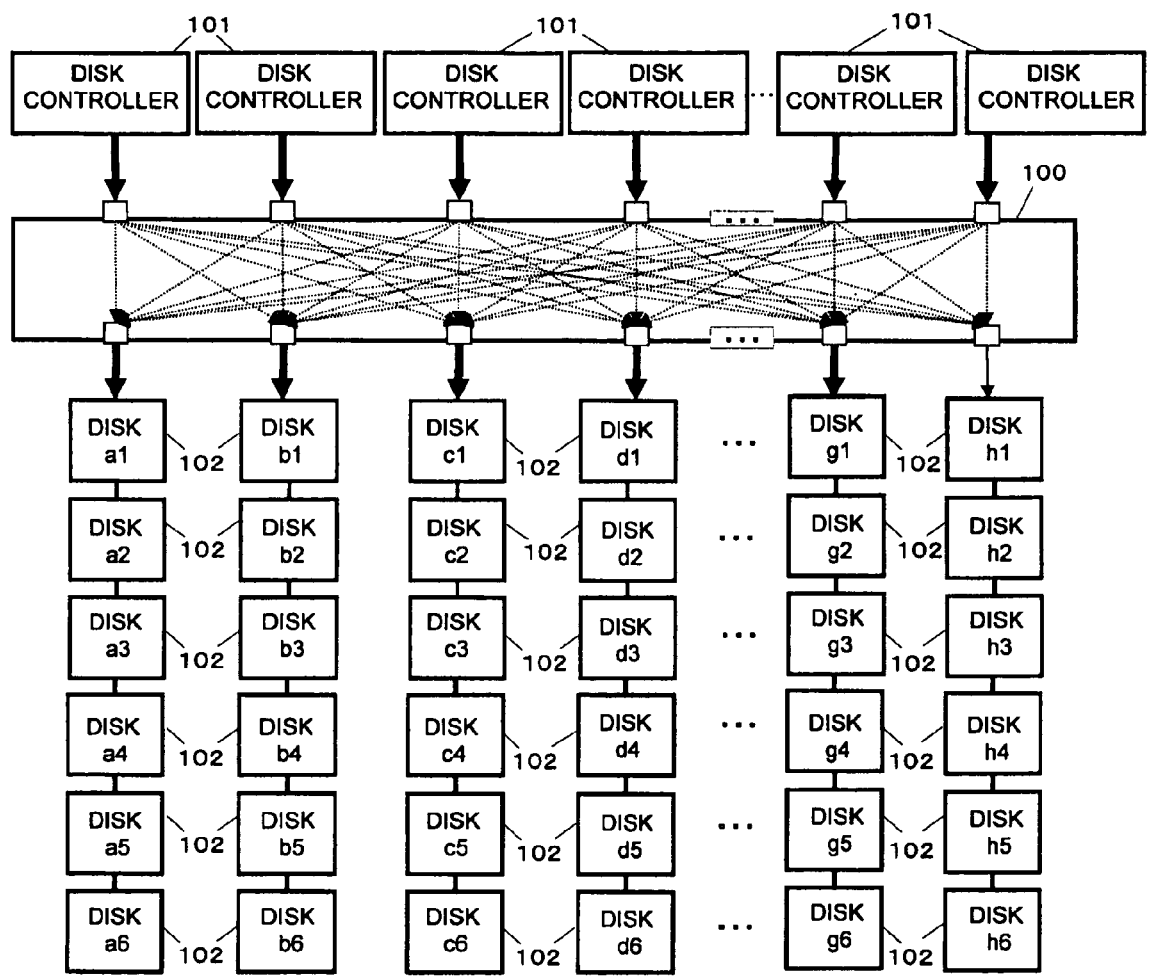

A second embodiment of the present invention will be described below. FIG. 4 is a diagram illustrating a command issue control processing flow of the second embodiment. In the second embodiment, the command issue control unit 11 of the CM 1 monitors the number of operating disks 300 and controls the number of commands to be issued to each disk loop so that the number of commands to be issued to each disk loop is equal to or smaller than a predetermined number. Therefore, even in the case where the number of commands to be issued to each disk 300 in a certain loop does not exceed the upper limit of the number of commands to be issued to each disk, issue of commands to the disks 300 in the loop can be restricted (stopped) when the number of commands to be issued to the whole loop exceeds the upper limit of the number of commands to be issued to each loop.

First, the command issue control unit 11 of the CM 1 executes processing for restricting the number of commands to be issued to each disk (step S11). Specifically, by executing the processing from step S1 to S4 in FIG. 3 described before, the command issue control unit 11 restricts the number of commands to be issued to a disk 300 to be equal to or smaller than the upper limit of the number of commands to be issued to the disk 300.

Next, the command issue control unit 11 determines whether the number of operating disks is equal to or larger than a predetermined number (step S12). When the command issue control unit 11 determines that the number of operating disks is not equal to or larger than the predetermined number, then the command issue control unit 11 issues a command (step S13). When the command issue control unit 11 determines that the number of operating disks is equal to or larger than the predetermined number, then the command issue control unit 11 restricts the number of commands to be issued to each disk loop (step S14) and proceeds to step S13. That is, in the second embodiment, command issue control for each loop is added. In this case, the upper limit of the number of commands to be issued to each loop, which is used for the command issue control for each loop, is assumed to correspond to the sum total of the upper limits of the number of commands to be issued to each disk, among the disks within the loop. The upper limit of the number of commands to be issued to each disk in the second embodiment is assumed to be a value higher than the value in the case where only command issue control for each disk is performed. In the second embodiment, at the time of issuing a command, it is not possible to issue the command unless both of the restrictions of the number of commands to be issued to each loop and to each disk are satisfied.

Setting of the upper limit of the number of commands to be issued to each disk and the upper limit of the number of commands to be issued to each loop will be specifically described below. In the case where only the command issue control for each disk is performed, the setting is made, for example, as illustrated below:

The number of disks: 50 disks,
The upper limit of the number of commands to be issued to each disk=100 commands,
The upper limit of the number of commands to be issued to each loop=none.

In the case of adding the command issue control for each loop, the setting is made, for example, as illustrated below:

The number of disks: 50 disks,
The upper limit of the number of commands to be issued to each disk=120 commands,
The upper limit of the number of commands to be issued to each loop=5000 (100×50) commands.

As the upper limit of the number of commands to be issued to each disk, a value lower than the processing limit of the disk 300 is set, in consideration of the load of the whole loop. By setting an upper limit for the number of commands to be issued to each loop and performing command issue control for each loop, using the upper limit of the number of commands to be issued to each loop, it is possible to raise the upper limit of the number of commands to be issued to each disk. This is because, even in the case where a lot of commands are issued to a part of the disks 300, the number of commands to be issued to the other disks 300 may be small and the number of commands equal to or smaller than a certain value can be kept as a whole loop. Thus, according to the second embodiment described above, it is possible to, by adding the command issue control for each loop, further improve the performance of the apparatus.

In the storage apparatus, the disk controller, and the command issue control method of the present embodiment, the disk controller which issues commands to disks via relay devices controls the number of commands to be issued to the disks based on the structure of the storage apparatus and the operation state of the storage apparatus.

Thus, according to the storage apparatus, the disk controller, the command issue control method, it is possible to control the number of commands to be issued to be an appropriate number and prevent command response deterioration even in the case where the structure of the storage apparatus is large-scaled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:
1. A storage apparatus comprising:
a plurality of disks that stores data;
a disk controller that issues a command to the disks;
a relay device that connects the disks and the disk controller,
wherein the disk controller includes a command issue control unit for controlling the number of commands to be issued to each disk or each disk loop in the storage apparatus based on an upper limit of the number of command issuance based on a structure of the disks in the storage apparatus and the number of disks that are operating in the storage apparatus.

2. The storage apparatus according to claim 1, wherein the command issue control unit monitors the number of disks that are operating in the storage apparatus and decides the upper limit of the number of command issuance based on the monitored number of the disks.

3. The storage apparatus according to claim 2, wherein the number of disks that are operating in a certain loop or whole in the storage apparatus is monitored as the number of the disks that are operating in the storage apparatus.

4. A disk controller that issues a command to a plurality of disks via a relay device in a storage apparatus, comprising:
a command issue control unit for controlling the number of commands to be issued to each disk over each disk loop in the storage apparatus based on an upper limit of the number of command issuance based on a structure of the disks in the storage apparatus and the number of disks that are operating in the storage apparatus.

5. The disk controller according to claim 4, wherein the command issue control unit monitors the number of disks that are operating in the storage apparatus and decides the upper limit of the number of the command issuance based on the monitored number of the disks.

6. A command issue control method executed by a processor for a storage apparatus including a disk controller that issues a command to a plurality of disks via a relay device, the method comprising:
in the disk controller, controlling the number of commands to be issued to each disk or each disk loop in the storage apparatus based on an upper limit of the number of command issuance based on a structure of disks in the storage apparatus and the number of disks that are operating in the storage apparatus.

7. The command issue control method according to claim 6, wherein,
in the disk controller, monitoring the number of disks that are operating in the storage apparatus and deciding the upper limit of the number of command issuance based on the monitored number of the disks.

* * * * *

UNITED STATES PATENT AND TRADEMARK OFFICE
CERTIFICATE OF CORRECTION

PATENT NO. : 8,145,834 B2  Page 1 of 1
APPLICATION NO. : 12/385362
DATED : March 27, 2012
INVENTOR(S) : Atsushi Ishii et al.

It is certified that error appears in the above-identified patent and that said Letters Patent is hereby corrected as shown below:

Column 6, Line 59, In Claim 1, delete "stores" and insert -- store --, therefor.

Signed and Sealed this
Fourth Day of September, 2012

David J. Kappos
*Director of the United States Patent and Trademark Office*